United States Patent
Kattainen et al.

(10) Patent No.: US 9,434,575 B2
(45) Date of Patent: Sep. 6, 2016

(54) METHOD AND DEVICE FOR A SAFE EMERGENCY STOP OF AN ELEVATOR

(71) Applicant: KONE Corporation, Helsinki (FI)

(72) Inventors: Ari Kattainen, Hyvinkää (FI); Antti Hovi, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 619 days.

(21) Appl. No.: 13/855,302

(22) Filed: Apr. 2, 2013

(65) Prior Publication Data
US 2013/0213745 A1    Aug. 22, 2013
Related U.S. Application Data

(63) Continuation of application No. PCT/FI2011/050818, filed on Sep. 22, 2011.

(30) Foreign Application Priority Data
Oct. 11, 2010    (FI) ..................................... 20106040

(51) Int. Cl.
| | | |
|---|---|---|
| B66B 1/32 | (2006.01) | |
| H02P 3/02 | (2006.01) | |
| H02P 3/18 | (2006.01) | |

(52) U.S. Cl.
CPC . B66B 1/32 (2013.01); H02P 3/02 (2013.01); H02P 3/18 (2013.01)

(58) Field of Classification Search
CPC ............... B66B 1/32; H02P 3/02; H02P 3/18
USPC ........ 187/247, 288, 290, 293, 391, 393, 289
See application file for complete search history.

(56) References Cited

U.S. PATENT DOCUMENTS

| | | | |
|---|---|---|---|
| 4,898,263 A | 2/1990 | Manske et al. | |
| 4,923,055 A | 5/1990 | Holland | |
| 6,186,281 B1 | 2/2001 | Pietrzykowski et al. | |
| 7,909,145 B2 * | 3/2011 | Erny | B66D 5/08 187/393 |
| 7,921,969 B2 * | 4/2011 | Stolt | B66B 1/30 187/293 |
| 8,430,212 B2 * | 4/2013 | Ueda | B66B 5/0031 187/247 |
| 8,584,812 B2 * | 11/2013 | Dorsch | B66B 5/0031 187/287 |
| 8,869,945 B2 * | 10/2014 | Harkonen | B66B 1/28 187/288 |
| 2013/0192932 A1 * | 8/2013 | Parillo | B66B 5/0018 187/289 |
| 2013/0313052 A1 * | 11/2013 | Della Porta | B66B 1/32 187/288 |
| 2014/0202798 A1 * | 7/2014 | Kattainen | B66B 5/0031 187/393 |
| 2015/0053507 A1 * | 2/2015 | Kattainen | B66B 1/32 187/288 |
| 2015/0083528 A1 * | 3/2015 | Kattainen | B66B 5/0031 187/393 |

FOREIGN PATENT DOCUMENTS

| | | |
|---|---|---|
| EP | 1 927 567 A1 | 6/2008 |
| KR | 10-0891443 B1 | 4/2009 |
| WO | WO 2008/102051 A1 | 8/2008 |
| WO | WO 2009/043965 A1 | 4/2009 |
| WO | WO 2009/127772 A1 | 10/2009 |

* cited by examiner

Primary Examiner — Anthony Salata
(74) Attorney, Agent, or Firm — Birch, Stewart, Kolasch & Birch, LLP

(57) ABSTRACT

A method and a safety device for implementing the method are provided in connection with a quick stop situation of an elevator. In the method, an activation process of a machinery brake is started and also a disconnection process of the current supply of the elevator motor is started after the starting of the activation process of a machinery brake.

20 Claims, 4 Drawing Sheets

METHOD AND DEVICE FOR A SAFE EMERGENCY STOP OF AN ELEVATOR

CROSS REFERENCE TO RELATED APPLICATIONS

This application is a Continuation of PCT International Application No. PCT/FI2011/050818 filed on Sep. 22, 2011, which claims priority under 35 U.S.C. §119(a) to Patent Application No. 20106040 filed in Finland on Oct. 11, 2010, all of which are hereby expressly incorporated by reference into the present application.

FIELD OF THE INVENTION

The invention relates to solutions for managing a quick stop situation of an elevator.

BACKGROUND OF THE INVENTION

In connection with an operational special situation of an elevator, such as in connection with an emergency stop of the elevator, on service drive, on rescue drive, in connection with an electricity outage and in connection with accurate releveling of the elevator, the elevator is generally stopped by starting a process which activates a machinery brake and also disconnects the current supply to the elevator motor. A quick stop situation of an elevator begins when the aforementioned process starts and ends when the elevator has stopped.

A quick stop situation of an elevator typically starts when the safety circuit of the elevator opens. Opening of the safety circuit starts disconnection of the electricity supply of the electromagnet of the machinery brake. When the electricity supply is disconnected and when the machinery brake activates, the brake shoe engages mechanically against the braking surface of the hoisting machine to brake the movement of the traction sheave of the hoisting machine. The elevator car is suspended in the elevator hoistway with ropes passing via the traction sheave, so that the brake shoe at the same time also brakes the movement of the elevator car. Opening of the safety circuit also causes opening of the contactor, or other controllable switch, fitted into the power supply circuit of the elevator motor, such that the electricity supply from the electricity network to the elevator motor disconnects.

The solution presented above contains problems. Engaging the brake shoe against the braking surface of the hoisting machine normally takes rather a long time, up to several hundred milliseconds; this is a consequence of, inter alia, the effect of the inductance of the electromagnet of the brake. Disconnection of the electricity supply of the elevator motor, on the other hand, causes discontinuation of the braking effect of the current of the elevator motor on the movement of the elevator car. If in this case the electricity supply to the elevator motor ceases before the machinery brake has been activated, the elevator car goes into a state of free fall for a moment, in which state the movement of the traction sheave of the hoisting machine/elevator car is not braked in any way whatsoever. The problem is accentuated in elevators comprising a gearless hoisting machine, because in this case the force difference in the suspension ropes acting on the different sides of the traction sheave of the hoisting machine generally produces greater acceleration during free fall of the elevator car than when using a geared hoisting machine. A state of free fall makes e.g. evaluation of the stopping point of the elevator car difficult. A state of free fall can, inter alia, cause the elevator car in certain operating situations, such as in connection with accurate releveling, to fail to stop sufficient accurately at a floor level. In this case a sill remains between the floor of the elevator car and the floor level, which sill hampers moving between the elevator car and the floor level. The sill can also cause a dangerous situation, e.g. to a person using a wheelchair, when moving a heavy object over the sill on rollers, et cetera.

Efforts have been made to speed up activation of the machinery brake in order to solve the problem by adding electronic/electrical components, such as resistors, capacitors or varistors, to the electricity supply circuit of the electromagnet of the machinery brake, with which components the quenching voltage over the coil of the electromagnet is increased, and thus reduction of the current is speeded up in a current disconnection situation. The use of a large quenching voltage, however, wears the components of the electricity supply circuit of the electromagnet. As the quenching voltage increases, many components also heat up more, causing, in addition to the lifetime problems of the components, also e.g. problems relating to thermal dimensioning. Increasing the quenching voltage also often causes the noise of the brake to increase when the brake shoe hits against the braking surface.

Efforts have been made to solve the problem also by increasing the disconnection delay of the current supply of the elevator motor, which disconnection delay lasts from the opening of the safety circuit to when the electricity supply to the elevator motor disconnects. The delay can be increased e.g. by adding a special delay circuit in connection with the control coil of the contactor that disconnects the electricity supply to the elevator motor. From this, however, it follows that disconnection of the current supply of the elevator motor slows down in all operating situations. In certain situations, such as when detecting a fault in the power supply circuit of the elevator motor, the current supply to the elevator motor must be disconnected as quickly as possible in order to prevent a hazardous situation. An extra disconnection delay might slow down use of the elevator also in connection with normal operation of the elevator. Therefore, instead of solving the problems, a delay circuit in fact creates new problem situations.

AIM OF THE INVENTION

The aim of the invention is to prevent the occurrence of a state of free fall in connection with a quick stop situation of an elevator without jeopardizing and/or slowing down the other operation of the elevator. To achieve this aim the invention discloses a method and also a safety arrangement of an elevator. The preferred embodiments of the invention are described in the dependent claims.

SUMMARY OF THE INVENTION

In the method according to the invention in connection with a quick stop situation of an elevator, an activation process of the machinery brake is started and also a disconnection process of the current supply is started for disconnecting the current supply occurring from the power source to the elevator motor, such that the disconnection process of the current supply is started separately after the starting of the activation process of the brake. In a preferred embodiment of the invention the start of the disconnection process of the current supply is delayed by the amount of the starting delay from the starting moment of the activation process of the brake. The starting delay of the disconnection process of the current supply is preferably determined on the basis of the activation delay of the machinery brake; in one embodiment the starting delay of the disconnection process of the current supply is determined, in addition to this, on the basis of the disconnection delay of the current supply of the elevator motor. The term activation delay of the machinery brake refers to the time that it takes from the formation of an activation command of the machinery brake to when the brake shoe engages mechanically against the braking surface of the machinery brake to brake the movement of the traction sheave. The activation delay of the machinery brake can be determined by observing the movement of the brake shoe e.g. from the current or inductance of the electromagnet of the machinery brake; the movement of the brake shoe can also be determined with a separate sensor, such as with a limit switch. The term disconnection delay of the current supply of the elevator motor refers to the time it takes from the formation of a command to disconnect the current supply to when the electricity supply to the elevator motor disconnects. In connection with the disconnection process of the current supply, the current supply is disconnected preferably by adjusting the current with a ramp to zero in a controlled manner using a power supply device of the elevator motor, such as a frequency converter. In this case e.g. the contactor possibly fitted into the power supply circuit of the elevator motor does not need to be used in disconnecting the current, which lengthens the lifetime of the aforementioned contactor.

The quick stop function of an elevator is preferably activated by sending from a safety device of the elevator to the elevator control unit a control command for activating a quick stop situation of the elevator. When a quick stop situation of the elevator starts, motor braking for decelerating the speed of rotation of the traction sheave of the hoisting machine is preferably started with the torque produced by the elevator motor. In this case the movement of the hoisting machine/elevator car starts to decelerate in a controlled manner immediately after activation of a quick stop situation.

In a preferred embodiment of the invention a braking command is sent with the elevator control unit to the power supply device of the elevator motor and also the activation process of a machinery brake as well as the disconnection process of the current supply are started with the elevator control unit.

In a preferred embodiment of the invention the status of the safety circuit of an elevator in connection with a quick stop situation of the elevator is determined with a safety device of the elevator, the status of the safety circuit of the elevator is monitored with a safety device of the elevator, and a separate safety process is started with a safety device of the elevator for activating the machinery brake in connection with a quick stop situation of the elevator and also for immediately disconnecting the current supply occurring from the power source to the elevator motor when the safety circuit of the elevator so requires.

In one embodiment of the invention the position and/or movement of the elevator car and/or the hoisting machine is/are determined in connection with a quick stop situation of the elevator with a safety device of the elevator, the position and/or movement of the elevator car and/or the hoisting machine is/are, in connection with a quick stop situation of the elevator, compared by a safety device of the elevator to the limit value for the movement and/or position defined as permitted for the elevator car and/or the hoisting machine, and also a safety process is started with a safety device of the elevator for activating the machinery brake as well as for immediately disconnecting the current supply occurring from the power source to the elevator motor when detecting that the movement and/or position of the elevator car and/or of the hoisting machine in this case deviates from that permitted. In this way it can be ensured that the movement and/or position of the elevator car remains safe within the defined limits during a quick stop situation. By means of the method it can be ensured that, inter alia, an operating malfunction of the power supply apparatus of the elevator motor does not produce the type of torque accelerating the elevator motor that would increase the risk of a hazardous situation.

In one embodiment of the invention the starting delay of the disconnection process of the current supply is determined on the basis of the motion information of the hoisting machine and/or a change in the motion information of the hoisting machine. In this case engagement of the brake shoe to brake the movement of the traction sheave can be detected on the basis of the motion information, preferably from a change/deceleration in the motion information, and the starting delay can be dimensioned on the basis of the moment of the change in the detected motion information.

In a preferred embodiment of the invention a controllable switch is fitted into the electricity supply circuit of the electromagnet of the machinery brake and also a controllable switch is fitted into the power supply circuit of the elevator motor. The aforementioned safety process is preferably started by forming a control signal for opening the aforementioned controllable switch fitted into the electricity supply circuit of the electromagnet of the machinery brake and also for opening the aforementioned controllable switch fitted into the power supply circuit of the elevator motor.

In a preferred embodiment of the invention the operating status of the elevator is determined and also a quick stop situation of the elevator is activated in connection with an operational special situation of the elevator. Possible operational special situations of the elevator are e.g. an emergency stop of the elevator, service drive, rescue drive, an electricity outage and/or accurate releveling of the elevator. In one embodiment the status of the safety circuit of the elevator is determined and also a quick stop situation of the elevator is activated on the basis of the status data of the safety circuit of the elevator.

The safety arrangement of an elevator according to the invention comprises a safety device of the elevator, which safety device is fitted to receive information about the operating status of the elevator and to activate a quick stop situation of the elevator in connection with an operational special situation of the elevator. The safety arrangement according to the invention is arranged to implement a method according to any of those disclosed above in connection with a quick stop situation of the elevator.

In a preferred embodiment of the invention the safety device comprises a control. In a preferred embodiment of the invention the aforementioned control is arranged to form a control command for activating a quick stop situation of the elevator. In addition the control is arranged to activate the aforementioned separate safety process for activating the machinery brake and also for disconnecting the current supply occurring from the power source to the elevator motor.

In a preferred embodiment of the invention the aforementioned control is made redundant. In this case the control can comprise two elements, such as microprocessors, that monitor the operating ability of each other. The elements are in this case connected to each other in a manner that enables data transfer such that information regarding the operating ability of the elements, such as messages, checksums, queries and responses to a query from the other element, can be transmitted between the elements. In addition, the elements can compare between themselves information received from one or more third elements, such as information about movement of the hoisting machine received from (one or more) sensors measuring the movement of the hoisting machine, information about movement of the elevator car from (one or more) sensors measuring the movement of the elevator car, information about the state of the safety switches of the elevator received from the safety circuit of the elevator, et cetera. On the basis of the comparison, the first and the second element can also, independently of other elements, make deductions about the operating condition of the other elements and also, if necessary, prevent use of the elevator on the basis of a deduction made by them about the operating condition of the other elements.

Taking into account what is presented above, the invention also relates to an elevator system, into which a safety arrangement of an elevator according to what is presented above has been fitted. The elevator system according to the invention can comprise a counterweight for balancing the weight of the elevator car in relation to the hoisting machine of the elevator, but the elevator system can also be one without a counterweight. Furthermore, the elevator system can also be with machine room or without machine room. Here the term elevator system refers to an elevator system intended more particularly for transporting passengers and/or freight, in which elevator system normal operation of the elevator occurs on the basis of elevator calls.

By means of the invention the duration of a state of free fall of an elevator can be shortened or the occurrence of a state of free fall can even be prevented altogether in connection with a quick stop situation of the elevator without jeopardizing and/or slowing down the other operation of the elevator. This is possible by starting a disconnection process of the current supply for disconnecting the power supply occurring from the power source to the elevator motor after starting an activation process of the brake, as is presented in the invention. This type of solution becomes possible when using a safety arrangement of an elevator according to the invention, which safety arrangement comprises a safety device of the elevator according to the invention, which safety device is fitted to receive information about the operating status of the elevator and also to activate a quick stop situation of the elevator in connection with an operational special situation of the elevator, and which safety arrangement is arranged in connection with a quick stop situation of the elevator to start a disconnection process of the current supply for disconnecting the power supply occurring from the power source to the elevator motor after starting an activation process of the brake.

The aforementioned summary, as well as the additional features and advantages of the invention presented below, will be better understood by the aid of the following description of some embodiments, said description not limiting the scope of application of the invention.

BRIEF EXPLANATION OF THE FIGURES

In the following, the invention will be described in detail with reference to the attached drawings, wherein.

MORE DETAILED DESCRIPTION OF PREFERRED EMBODIMENTS OF THE INVENTION

Figure 1:
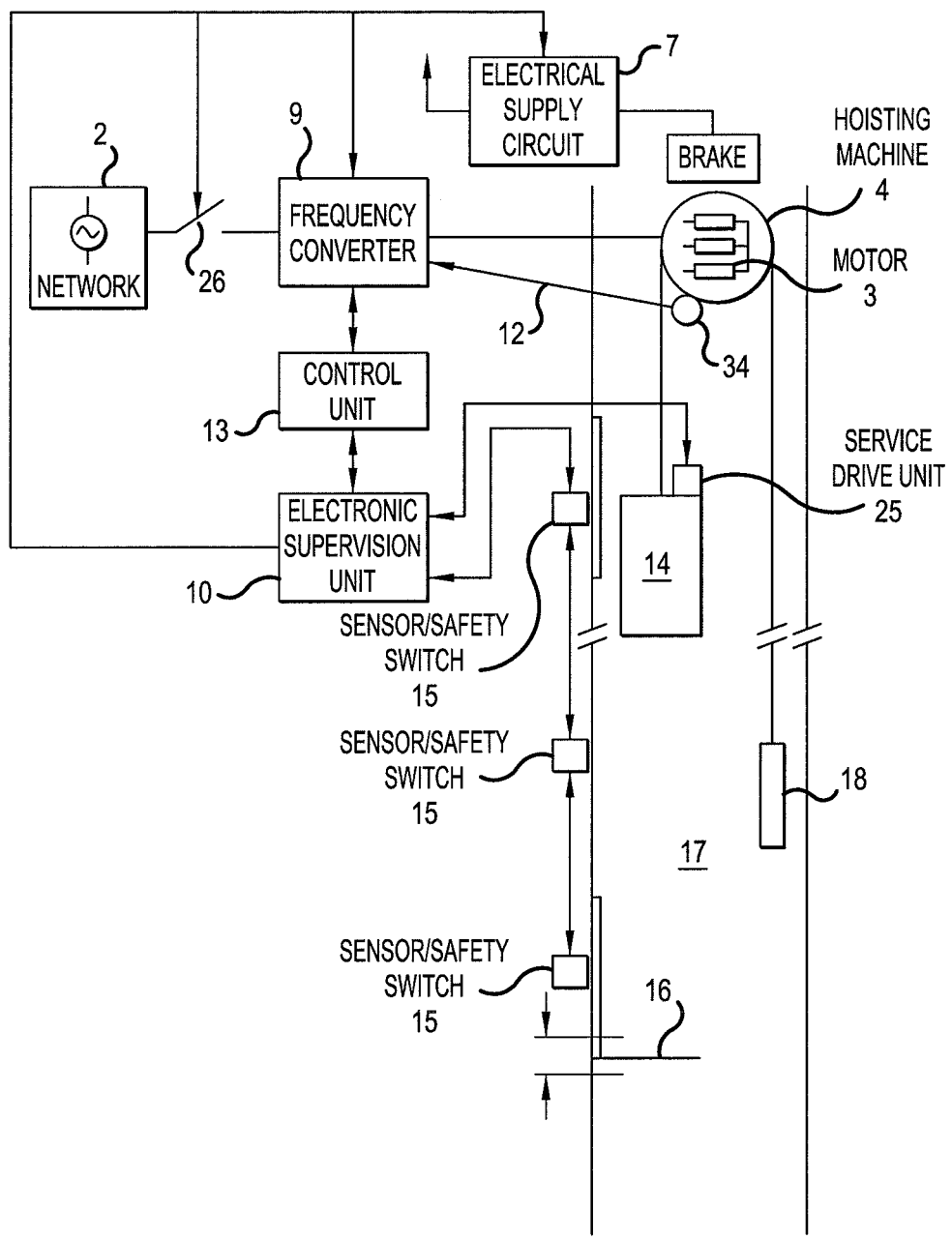
FIG. 1 presents as a block diagram an elevator system, into which a safety arrangement of an elevator according to the invention has been fitted
Figure 3:
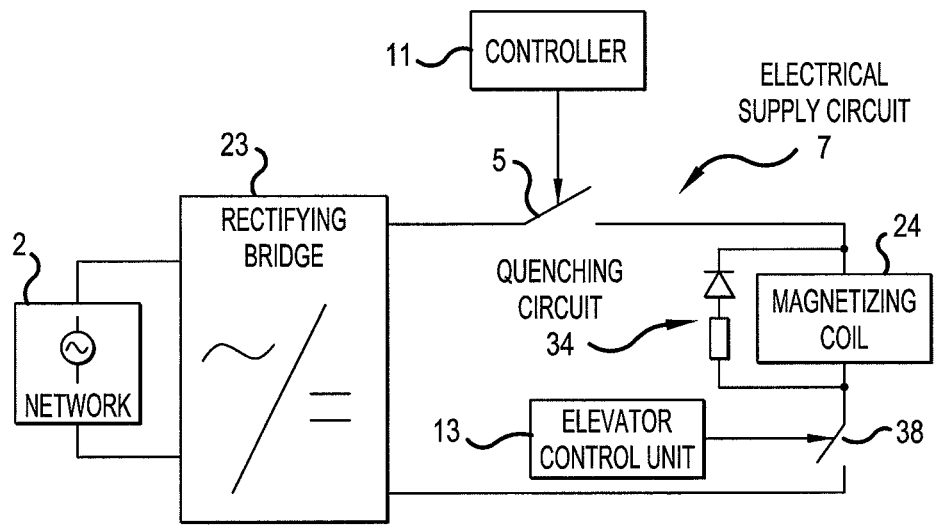
FIG. 3 presents a simplified view of a electricity supply circuit of an electromagnet of a machinery brake according to the invention
Figure 5:
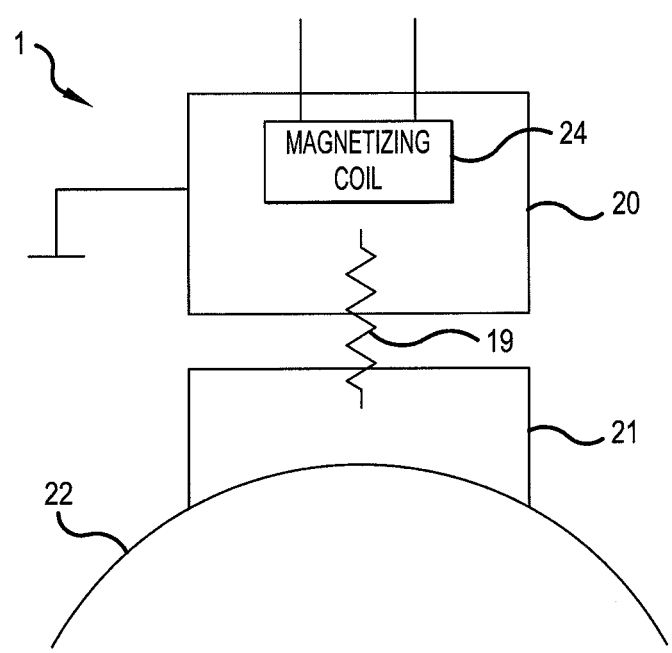
FIG. 5 illustrates the operating principle of a machinery brake according to the invention

In the elevator system of FIG. 1 the elevator car 14 and the counterweight 18 are suspended in the elevator hoistway 17 with ropes, a belt or corresponding passing via the traction sheave of the hoisting machine 4. An elevator motor 3 functions as the power-producing part of the hoisting machine 4, with the torque produced by which elevator motor the elevator car 14 is moved and supported in the elevator hoistway 17. The elevator motor 3 is nowadays most commonly an alternating current motor, such as a permanent-magnet synchronous motor or induction motor, but also DC motors are used. Here the elevator motor 3 is an alternating current motor, more precisely a permanent-magnet synchronous motor, and the current supply from the electricity network 2 to the elevator motor 3 occurs with a frequency converter 9. The elevator control unit 13 calculates the speed reference, i.e. the target profile for speed, of the elevator car 14, according to which speed reference it is aimed to move the elevator car in the elevator hoistway. The elevator control unit 13 communicates the speed reference to the frequency converter 9 via a data transfer bus between the elevator control unit 13 and the frequency converter 9. With the inverter of the frequency converter 9 the current of the elevator motor 3, and at the same time also the torque of the elevator motor 3, is adjusted such that the speed of the elevator motor 3, and therefore of the elevator car 14, approaches the aforementioned speed reference of the elevator car. During a standstill of the elevator, the elevator car 14 has stopped at a landing floor 16 and movement of the traction sheave of the hoisting machine 4 has been prevented with the machinery brakes 1. FIG. 5 presents the operating principle of a machinery brake 1 applicable for use e.g. in the embodiment of FIG. 1. The machinery brake 1 comprises a brake shoe 21, which is able to move in relation to the frame part 20 of the machinery brake, said frame part being fixed to a stationary part of the hoisting machine 4. When activated the brake is preventing movement of the traction sheave of the hoisting machine 4, as the spring plates 19 press the brake shoe 21 against the braking surface 22 of the hoisting machine 4. The brake opens when current is supplied to the magnetizing coil 24 of the electromagnet of the brake, which current produces an attractive force between the frame part 20 of the machinery brake and the brake shoe 21, pulling the brake shoe 21 away from the braking surface 22. Correspondingly, the brake activates when the current supply to the magnetizing coil 24 of the electromagnet is disconnected. In a preferred embodiment of the invention the hoisting machine of the elevator comprises two separate machinery brakes 1 (only one of the brakes is presented in FIG. 1), which are dimensioned such that either of the brakes 1 is able on its own to prevent movement of the traction sheave of the hoisting machine 4, e.g. when the other brake 1 malfunctions. FIG. 3 presents the electricity supply circuit 7 of the electromagnet of the machinery brake, which electricity supply circuit is applicable for using in the control of the machinery brake 1 e.g. in the embodiment of FIG. 1.

The voltage to be supplied from an alternating electricity source 2, such as from the secondary winding of a protectively-earthed transformer, is rectified with a rectifying bridge 23 into direct-current voltage. The rectified voltage is connected to the poles of the magnetizing coil 24 of the electromagnet by closing the controllable switches 5, 38, in which case direct-current starts to flow through the magnetizing coil 24 and the brake opens. The aforementioned controllable switches 5, 38 can be e.g. relays, contactors and/or solid-state switches. When the aforementioned controllable switch 5, 38 is opened, the current flow from the DC voltage output of the rectifying bridge 23 to the magnetizing coil 24 ceases, and the current flowing through the magnetizing coil 24 commutates to travel via the quenching circuit 34 that is connected in parallel with the magnetizing coil 24. The resistance in the quenching circuit causes the quenching voltage between the poles of the magnetizing coil 24 to increase, speeding up the disconnection of the current of the magnetizing coil 24 and consequently the activation of the brake 1. It is not desired, however, to increase the resistance unreasonably because the warming of the resistance, and also the increase in quenching voltage, wears the components of the electricity supply circuit 7 of the electromagnet. The magnetizing coils 24 of different machinery brakes 1 can be connected in parallel in the electricity supply circuit 7, or the electricity supply to the magnetizing coils 24 of different machinery brakes can also occur via separate controllable switches 5, 38, in which case the different machinery brakes 1 can also be controlled independently of each other.

During normal operation of the elevator the elevator control unit 13 opens the brake when starting a run with the elevator by closing the switch 38 and also activates the brake at the end of the run of the elevator by opening the switch 38.

In the embodiment of FIG. 1 a separate electronic supervision unit 10 has been fitted to the safety system of the elevator system, which electronic supervision unit is connected to the sensors/safety switches 15 measuring the safety of the elevator with a data transfer bus. The supervision unit 10 as well as the sensors/safety switches 15 connected to it with a data transfer bus form the safety circuit of the elevator. The aforementioned sensors/safety switches 15 measuring the safety of the elevator are fitted e.g. in connection with the landing doors, to measure the position/locking of a landing door; the sensors/switches are also inter alia in the elevator shaft 17, limiting the areas of permitted movement of the elevator car 14, and also in connection with the service drive unit 25 of the elevator car. In addition, the supervision unit 10 is connected to the elevator control unit 13 with a data transfer bus. The supervision unit 10 is fitted to receive via a data transfer bus/data transfer buses information about the operating status of the elevator, more particularly information relating to the safety of the elevator, and also to determine on the basis of the information received an operational special situation of the elevator. This type of operational special situation of an elevator is e.g. an emergency stop of the elevator, service drive, rescue drive, an electricity outage and/or accurate releveling of the elevator. In an operational special situation of the elevator, the supervision unit 10 always sets a quick stop situation to be the stopping situation of the elevator. In a quick stop situation the elevator is stopped by activating the machinery brake 1 and also by disconnecting the current supply to the elevator motor 3.

Figure 2:
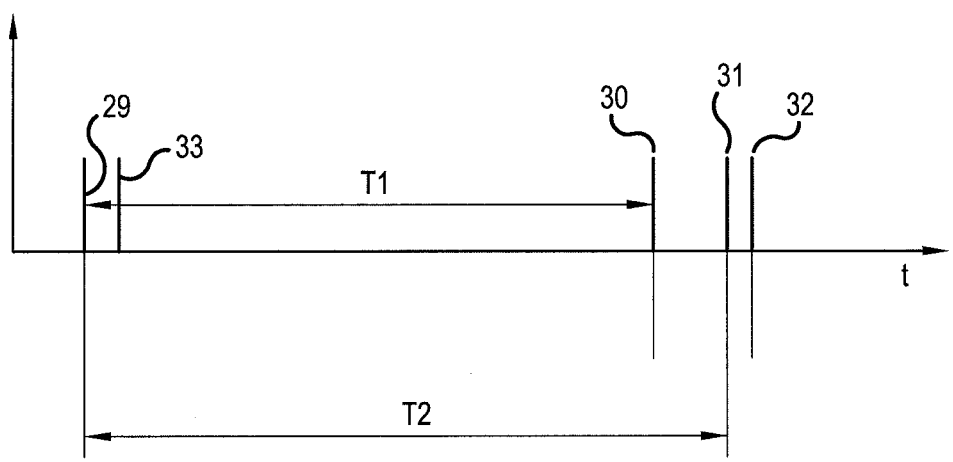
FIG. 2 illustrates as a time chart the progress of a quick stop situation of an elevator according to the invention

FIG. 2 illustrates as a time chart the progress of a quick stop situation in one embodiment of the invention according to FIG. 1. At the moment 29 the supervision unit 10 sends to the elevator control unit 13, via a data transfer bus between the elevator control unit 13 and the supervision unit 10, an activation command for activating a quick stop situation of the elevator. Immediately after it has received an activation command, the elevator control unit 13 sends to the frequency converter 9, via a data transfer bus between the elevator control unit 13 and the frequency converter 9, a braking command for decreasing the speed of the elevator car. After having received a braking command, the frequency converter 9 immediately starts to decelerate the speed of rotation of the traction sheave of the hoisting machine 4 at a set deceleration by adjusting the current, and at the same time the torque, of the elevator motor 3.

Immediately after having received an activation command of a quick stop situation, the elevator control unit 13 also starts an activation process of the machinery brake by forming for both machinery brakes 1 a control signal for opening the controllable switch 38 in the electricity supply circuit 7 of the electromagnet of the machinery brake 1. After a certain opening delay the switch 38 opens at the moment 33. In this case the current of the magnetizing coil 24 commutates to travel via the quenching circuit 34 that is in parallel with the magnetizing coil 24 and the brake current starts to decrease. After a moment the brake current has decreased so much that the thrusting force produced by the spring plates 19 of the machinery brake 1 overcomes the force of attraction produced by the electromagnet and the brake shoe 21 starts to move towards the braking surface 22 of the hoisting machine. At the moment 31, i.e. after the activation delay T2 from the starting of the activation process of the machinery brake 1, the brake shoe 21 presses against the braking surface 22 and the brakes activate to brake the movement of the traction sheave of the hoisting machine 4.

After a certain time delay T1, from the starting of the activation process of the machinery brake 1, at the moment 30 the elevator control unit 13 starts a disconnection process of the current supply for disconnecting the current supply occurring from the electricity network 2 to the elevator motor 3. In this case the elevator control unit 13 sends a command to the frequency converter 9 to disconnect the current supply, in response to which the frequency converter 9 stops speed regulation in connection with motor braking and starts to reduce the current of the elevator motor 3 with a certain ramp such that the current goes to zero at the moment 32.

According to FIG. 2, by delaying the starting moment 31 of the disconnection process of the current supply by the amount of the time delay T1 from the starting moment 29 of the activation process of the brake, the occurrence of the type of free fall situation of the elevator car in which the movement of the elevator car is not braked in any way at all can be prevented. If, for some reason, the activation delay T2 of the brake is longer than estimated, a state of free fall is not necessarily totally eliminated, but the duration of the state can, however, be essentially reduced. In this way safety and also stopping accuracy can be improved, because in a state of free fall the speed of the elevator car accelerates for a while in an uncontrolled manner from the effect of the force difference in the suspension ropes acting on different sides of the traction sheave. For example, in connection with accurate releveling of the elevator, it is difficult to get the elevator car to stop precisely at the stopping floor 16, if the elevator car is able to move in an uncontrolled manner always after a stopping command. On the other hand, e.g. in connection with an emergency stop of the elevator, i.e. when activating a quick stop situation when detecting a hazardous situation in connection with a normal run of the elevator, the speed of the elevator car might increase during a state of free fall even more before the machinery brakes 1 activate to brake the movement of the hoisting machine/elevator car. This again might cause lengthening of the stopping distance of the elevator car in an emergency stop situation.

After a quick stop situation of the elevator has been activated, the supervision unit 10 determines and monitors the status of the safety circuit 10, 15 of the elevator. If the supervision unit detects on the basis of the status of the safety circuit 10, 15 of the elevator that the safety of the elevator has in this case been endangered, the supervision unit 10 starts a separate safety process for activating the machinery brake 1 and also for disconnecting the current supply occurring from the electricity network 2 to the elevator motor 3. In one embodiment of the invention the supervision unit 10 additionally measures during a quick stop situation the speed of rotation of the traction sheave of the hoisting machine 4 of the elevator, e.g. by means of an encoder 34 fitted in connection with a rotating part of the hoisting machine 4, and monitors the movement of the hoisting machine 4 by means of the measured speed information 12 of the hoisting machine 4. In this case when it detects that the speed of rotation 12 of the hoisting machine has grown larger than that permitted, the supervision unit 10 deduces that there is an operating malfunction in the speed regulator of the elevator motor 3, in the frequency converter 9, and immediately starts a separate safety process for activating the machinery brake 1 and also for disconnecting the current supply occurring from the power source 2 to the elevator motor 3.

When starting the aforementioned separate safety process, the supervision unit 10 forms a control signal, in response to which the controllable switch 5 fitted to the electricity supply circuit 7 of the electromagnet of the machinery brake opens and the current supply to the magnetizing coil 24 of the electromagnet disconnects. In addition, the controllable switches 8, 26 fitted into the power supply circuit of the elevator motor also open in response to the aforementioned control signal. When the switches 8, 26 that are in the power supply circuit of the elevator motor open, the current supply from the electricity network 2 to the elevator motor 3 disconnects.

Figure 4:
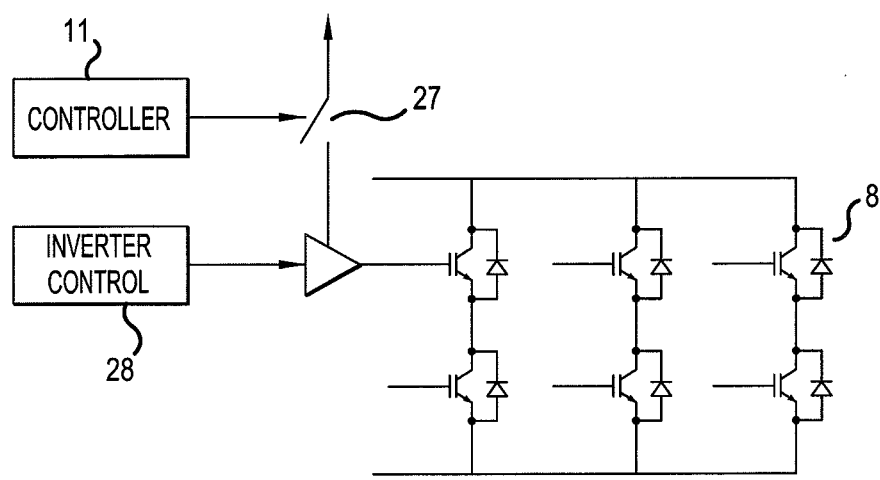
FIG. 4 presents an inverter of a power supply circuit of an elevator motor according to the invention

In one embodiment of the invention the supervision unit 10 disconnects the electricity supply to the elevator motor 3 by controlling open the contacts of the contactor 26 that is between the electricity network 2 and the frequency converter 9. The contactor 26 is generally of the type that actively closes in a controlled manner, so the contactor opens when the supervision unit 10 disconnects the current supply to the control coil of the contactor 26. In addition, disconnection of the current supply of the elevator motor 3 is ensured by controlling open, on the basis of the same control signal of the supervision unit 10, the controllable switches (usually IGBT transistors) to be connected to the positive DC busbar and/or negative DC busbar of the inverter of the frequency converter 9. The control circuit of the switches of the inverter is illustrated in FIG. 4. The electricity supply to the control poles of the switches 8, preferably IGBT transistors, occurs with an amplifier circuit under the control of an inverter control 28. The inverter switches 8 can be controlled open either by preventing access of the control pulses of the inverter control 28 to the amplifier circuit or, as presented in FIG. 4, by disconnecting the electricity from the amplifier circuit by opening the controllable switch 27. A recent aim has been so-called "contactorless" solutions, wherein disconnection of the electricity supply of the elevator motor 3 is implemented without a separate mechanical contactor 26. In this case, of course, the supervision unit 10 is fitted to disconnect the electricity supply of the elevator motor 3 otherwise than what is presented above, e.g. by controlling open only the controllable switches 8 to be connected to the positive DC busbar and/or negative DC busbar of the inverter of the frequency converter 9.

In one embodiment of the invention the supervision unit 10 disconnects the current of the magnetizing coil 24 of the electromagnet of the machinery brake using two switches 5 that are in series with each other in the electricity supply circuit 7. In this way the reliability of the current disconnection function can be improved.

The supervision unit 10 comprises a control part 11, which is made redundant with two microprocessors that monitor the operating state of each other. Both processors can independently of each other, e.g. in connection with a malfunction of the supervision unit 10, send a control signal for starting the aforementioned separate safety process.

The invention is described above by the aid of a few examples of its embodiment. It is obvious to the person skilled in the art that the invention is not limited only to the embodiments described above, but that many other applications are possible within the scope of the inventive concept defined by the claims.

Further, the machinery brakes 1 described are drum brakes, but the machinery brakes 1 can also just as well be e.g. disc brakes.

The invention claimed is:

1. A method in connection with a quick stop situation of an elevator, said method comprising the steps of:
   starting an activation process of a machinery brake; and
   starting a disconnection process of a current supply for disconnecting the current supply occurring from a power source to an elevator motor,
   wherein the disconnection process of the current supply is started after the starting of the activation process of the machinery brake.

2. The method according to claim 1, wherein
   when a quick stop situation of the elevator starts, motor braking for decelerating the speed of rotation of the traction sheave of the hoisting machine is started.

3. The method according to claim 1, wherein:
   a control command for activating a quick stop situation of the elevator is sent from a safety device of the elevator to the elevator control unit.

4. The method according to claim 1, wherein:
   the activation process of the machinery brake as well as the disconnection process of the current supply are started with the elevator control unit.

5. The method according to claim 1, wherein:
   the start of the disconnection process of the current supply is delayed by the amount of the starting delay from the starting moment of the activation process of the brake.

6. The method according to claim 5, wherein:
   the starting delay of the disconnection process of the current supply is determined on the basis of the activation delay of the machinery brake.

7. The method according to claim 1, wherein:
   the status of the safety circuit of an elevator in connection with a quick stop situation of the elevator is determined with a safety device of the elevator;
   the status of the safety circuit of the elevator is monitored with a safety device of the elevator; and a separate safety process is started with a safety device of the elevator for activating the machinery brake in connection with a quick stop situation of the elevator and also for immediately disconnecting the current supply occurring from the power source to the elevator motor when the safety circuit of the elevator so requires.

8. The method according to claim 1, wherein:

the position and/or movement of the elevator car and/or the hoisting machine is/are determined in connection with a quick stop situation of the elevator with a safety device of the elevator;

the position and/or movement of the elevator car and/or the hoisting machine is/are, in connection with a quick stop situation of the elevator, compared by a safety device of the elevator to the limit value for the movement and/or position defined as permitted for the elevator car and/or the hoisting machine; and a safety process is started with a safety device of the elevator for activating the machinery brake and also for immediately disconnecting the current supply occurring from the power source to the elevator motor when detecting that the movement and/or position of the elevator car and/or of the hoisting machine in this case deviate(s) from that permitted.

9. The method according to claim 7, wherein:

a controllable switch is fitted into the electricity supply circuit of the electromagnet of the machinery brake;

a controllable switch is fitted into the power supply circuit of the elevator motor; and the safety process is started by forming a control command for opening the aforementioned controllable switch fitted into the electricity supply circuit of the electromagnet of the machinery brake and also for opening the controllable switch fitted into the power supply circuit of the elevator motor.

10. The method according to claim 1, wherein:

the operating status of the elevator is determined; and a quick stop situation of the elevator is activated in connection with an operational special situation of the elevator.

11. A safety arrangement of an elevator, comprising:

a safety device of the elevator, which safety device is fitted to receive information about the operating status of the elevator and further to activate a quick stop situation of the elevator in connection with an operational special situation of the elevator, wherein the safety arrangement is arranged to implement the method according to claim 1 in connection with the quick stop situation of the elevator.

12. The safety arrangement according to claim 11, wherein the safety device comprises a control.

13. The safety arrangement according to claim 12, wherein the control is arranged to form a control command for activating a quick stop situation of the elevator.

14. The safety arrangement according to claim 12, wherein the control is arranged to activate the safety process for activating the machinery brake and also for disconnecting the current supply occurring from the power source to the elevator motor.

15. The safety arrangement according to claim 12, wherein the control is made redundant.

16. The method according to claim 2, wherein a control command for activating a quick stop situation of the elevator is sent from a safety device of the elevator to the elevator control unit.

17. The method according to claim 2, wherein the activation process of the machinery brake as well as the disconnection process of the current supply are started with the elevator control unit.

18. The method according to claim 3, wherein the activation process of the machinery brake as well as the disconnection process of the current supply are started with the elevator control unit.

19. The method according to claim 2, wherein the start of the disconnection process of the current supply is delayed by the amount of the starting delay from the starting moment of the activation process of the brake.

20. The method according to claim 3, wherein the start of the disconnection process of the current supply is delayed by the amount of the starting delay from the starting moment of the activation process of the brake.

* * * * *